No. 628,729. Patented July 11, 1899.
A. SHEDLOCK & J. A. HUDSON.
APPARATUS FOR SETTING OR CURING FLEXIBLE MATERIAL OR ARTICLES FORMED THEREFROM.
(Application filed May 18, 1899.)
(No Model.) 2 Sheets—Sheet 2.
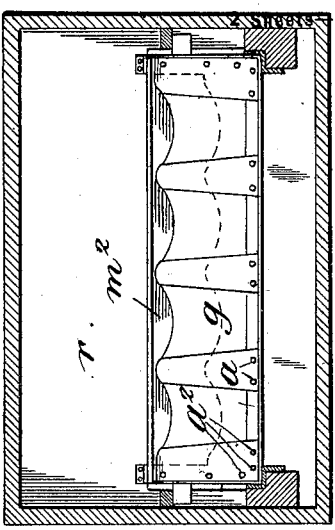
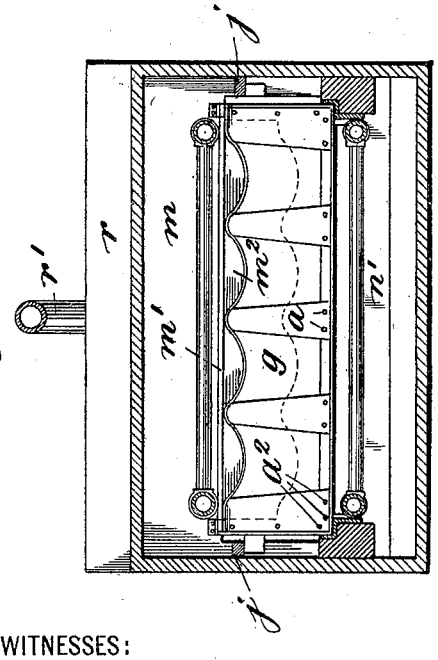
WITNESSES:
INVENTORS
Alfred Shedlock
James A. Hudson
BY Alfred Shedlock
ATTORNEY

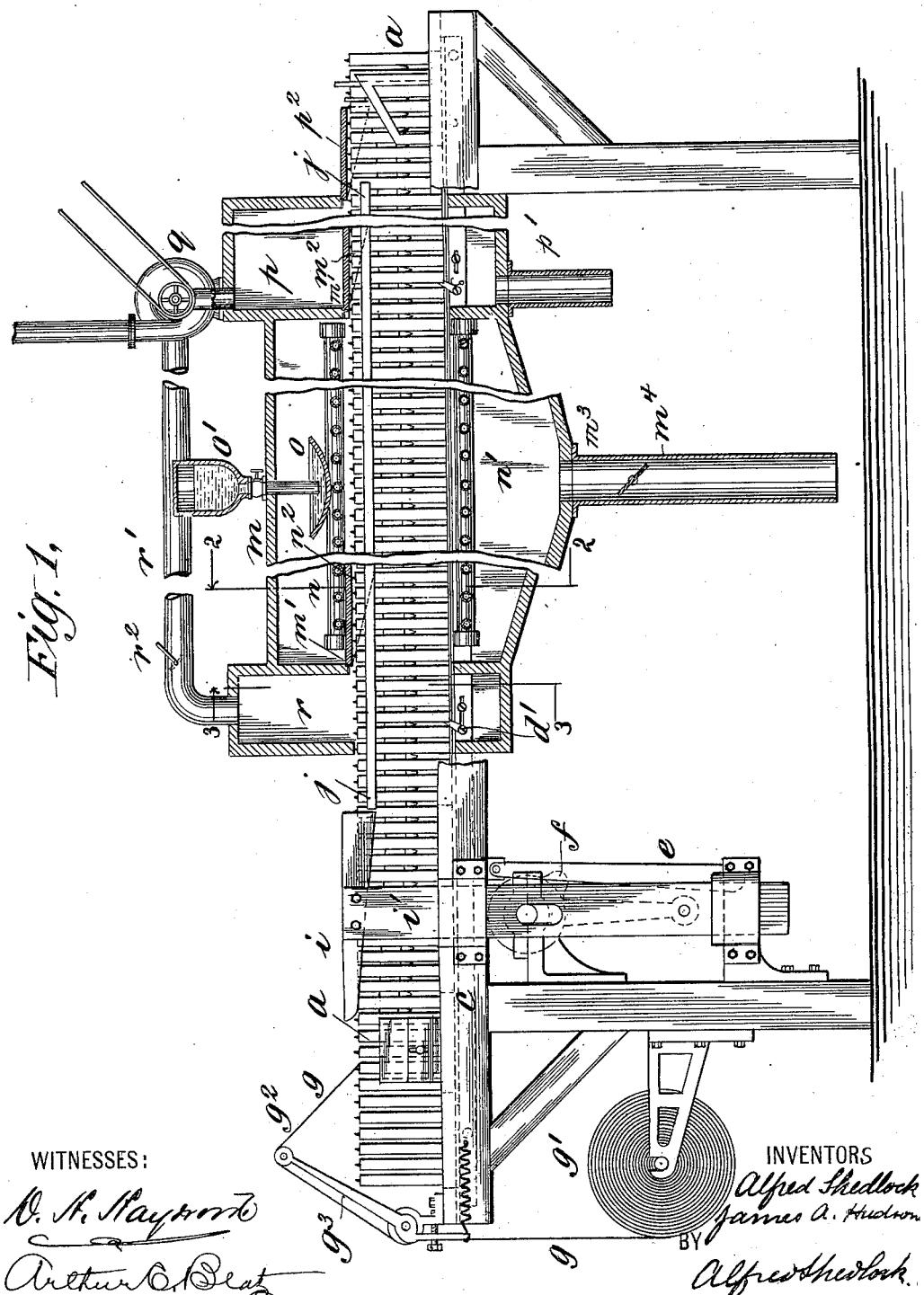

UNITED STATES PATENT OFFICE.

ALFRED SHEDLOCK, OF JERSEY CITY, NEW JERSEY, AND JAMES A. HUDSON, OF NEW YORK, N. Y., ASSIGNORS TO THE I. B. KLEINERT RUBBER COMPANY, OF NEW YORK, N. Y.

APPARATUS FOR SETTING OR CURING FLEXIBLE MATERIAL OR ARTICLES FORMED THEREFROM.

SPECIFICATION forming part of Letters Patent No. 628,729, dated July 11, 1899.

Original application filed January 27, 1899, Serial No. 703,560. Divided and this application filed May 18, 1899. Serial No. 717,267. (No model.)

*To all whom it may concern:*

Be it known that we, ALFRED SHEDLOCK, a resident of Jersey City, in the county of Hudson and State of New Jersey, and JAMES A. HUDSON, a resident of New York, in the county of New York and State of New York, citizens of the United States, have invented certain new and useful Improvements in Apparatus for Setting or Curing Flexible Material or Articles Formed Therefrom, of which the following is a specification.

The apparatus for curing or setting flexible material or articles formed therefrom forming the subject of this invention comprises a practically air-tight chamber supplied with a constant charge of the curing or setting medium in the form of vapor or gas and through which the material or articles is or are caused to pass in continuous order, the length of chamber being so proportioned relative to the speed of the material or articles that it or they will be properly cured or set during the passage of the same through the chamber, an ante-chamber surrounding the entrance-opening of the curing or setting chamber for the collection of any vapor or gas that may pass out of such opening around the material or articles as it or they enter the curing-chamber, and a post-chamber surrounding the exit-opening of the curing or setting chamber for the collection of the vapor or gas that may escape from this end of the chamber, permitting the vapor or gas to pass off from the cured or set material or articles while under cover and allowing the same to be cooled off when heat is used in the curing or setting process before being exposed to the atmosphere of the room in which the apparatus is placed.

The invention also includes other features, such as doors or gates adapted to close the openings of the chambers when free of the material or articles or formers upon which the material or articles are held and to reduce such openings to a minimum when the formers are passing through the chambers, means for heating the curing or setting chamber, means for supplying said chamber with a constant supply of the setting or curing medium, means for drawing off the gases from the ante-chamber and the post-chamber and to produce cooling effects in the post-chamber, and also a suitable mechanism for moving the formers carrying the material or articles through the chambers.

In the accompanying drawings, illustrating our present invention, Figure 1 is a longitudinal elevation, partly in section, of the apparatus. Fig. 2 is a transverse section of the same on the line 2 2, Fig. 1; and Fig. 3 is a similar section on the line 3 3, Fig. 1.

The apparatus constituting the main feature of this invention is here shown in conjunction with a series or continuous row of formers $a$ $a$, adapted to form and carry a vulcanizable material, as stockinet and rubber combined, such as is used in the manufacture of dress-shields, and with a suitable mechanism for applying the material to the formers, which will be hereinafter briefly described and which forms the subject of an application for Letters Patent filed by us January 27, 1899, under Serial No. 703,560, of which application this present one is a division.

The curing or setting chamber $m$ is an air-tight box supported by a frame $c$ of sufficient length to insure the proper conversion of the material as it travels from one end of the chamber to the other. It is for general application of its use provided with means for heating it to the desired degree, preferably consisting of steam heater-pipes $n\,n'$, arranged, respectively, above and below the line of traveling formers $a$, upon which the material or articles are placed, with flap-doors $m'\,m'$ at its ends, which fall down and close the openings through which the formers pass when the chamber is unoccupied by them and which are supplied with flexible coverings or shields $m^2$ of a nature to lie closely to the upper sides of the formers and the curves or irregular formed portions of the upper parts of the material or articles, so as to make the openings of the chamber as nearly as possible air-tight when the formers, with the formed material or articles, are passing through it.

These coverings or shields $m^2 m^2$ are of a suitable flexible fabric or material, secured at one of their edges to the hinged edges of the doors $m' m'$, the other or outer edges of the fabric being loose and free to fall down in close contact with the upper parts of the formers $a$ $a$. The chamber $m$ is provided with a discharge-pipe $m^3$, provided with an adjustable damper $m^4$ and preferably extending from the under side of the chamber and which may be continued to any convenient location to carry the fumes or exhausted gases from the chamber, and thus leave the building or room free from inconvenience of the same.

When the curing or vulcanization of the convertible part of the material is to be produced by means of a chemical or of a chemical in conjunction with heat, it is proposed to supply the same, preferably in liquid form, to an open dish $o$, located above the material, and to maintain a uniform level of the same in the dish from an inverted bottle $o'$, having a long neck extending down through a hole in the top of the box $m$ into and beneath the surface of the liquid in the dish, said bottle acting on the principle of a bird-fountain. The neck of the bottle may be provided with a stop-cock, which can be used to prevent undue escape of the liquid from the bottle as it is placed in position after being filled and which may be used to regulate the flow of the liquid into the dish $o$. This arrangement of the active curing or vulcanizing liquid is adopted when the gases given off from the same under the influence of heat have greater density than the atmosphere, the said chamber being kept fully charged with the gases, the residue of which is allowed to escape through the pipe $m^3$ after the active principle has been taken up by the material as the gases pass over the material—as, for instance, in vulcanizing a pure-gum rubber or rubber combined with a fabric bichlorid of sulfur may be the liquid used, the fumes or gases of which are heavier than the atmosphere. A forced discharge of the gases from the chamber may be induced by means of an exhaust-fan (not shown) applied to the pipe $m^3$. The discharge-pipe may in some cases be advantageously at the upper part of and liquid placed in the lower part of the chamber. To prevent the gases that may surround the material as it leaves the chamber $m$ escaping into the room, a closed chamber $p$ is formed at the discharge end of the chamber $m$, and this chamber $p$ may also be used as a cooling-chamber to cool off the material as it passes therethrough before being handled, which is desirable to insure the material maintaining the set imparted to it in the forming and curing processes. To accomplish these objects advantageously, this chamber is provided with a pipe $p'$, through which air, cooled, if desired, may be drawn, and may have a flap-door $p^2$, with a flexible shield, like the doors $m'$, at the discharge-opening, and to insure a constant change of air to flow over the material a pressure-blower (not shown) or an exhaust-fan may be placed in communication with the chamber. If exhaust effects are desired, a suction-fan $q$ may be located and operated at the upper part of the chamber. The antechamber $r$, located at the entrance end of the chamber $m$, is designed to collect such of the gases as may escape through the entrance-opening, and to cause a discharge of the same connection may be made with a pressure-blower or with the suction-fan $q$, connected with the discharge from the chamber $p$. The pipe connection $r'$ when exhaust effects are required in the chamber $r$ joins the top of this chamber $r$ to the inlet of the fan $q$, said pipe being provided with a damper $r^2$ to govern the flow of air through the chamber $r$.

Before the formers $a$ $a$ are passed into and through the chambers $r$ $m$ $p$ the doors $m' m'$ and $p^2$ close the openings to the chambers $m$ $p$. The formers are successively placed in position to have the material $g$ applied to them, which is drawn from the roll $g'$ over the roller or bar $g^2$, carried by the swinging frame $g^3$, and are then intermittently carried forward along guideways on the top of the frame by dogs $d'$, attached to sliding bars arranged under the formers, said bars being actuated by the lever $e$ under the influence of the cam $f$ on the driving-shaft of the feeding mechanism. The rotation of this shaft also vertically reciprocates a slide $i'$ at each side of the machine, to the upper ends of each of which is attached an inclined ledge $i$ for acting on the shaping parts of the formers, which parts when depressed are held down by the horizontal ledges $j$ $j$, which extend through the chambers $r$ $m$ $p$. As the formers are supplied with the material and moved successively forward the first one pushes the doors $m' m'$ and $p^2$ open, and the doors are held open by the succeeding formers, as shown in the drawings, the formers being continuously caused to travel through the curing or setting chamber during the time the apparatus is in active use. It is evident that this curing or vulcanizing apparatus may be used with any kind of formers or molds adapted to hold and form material of a flexible nature, whether the formers or molds are of the character here shown, and charged with the material by the mechanism specifically described and claimed in our before-mentioned application, and are caused to travel continuously through the apparatus, or whether a series or long line of formers or molds are, after being charged with the material in any manner, placed in the curing or vulcanizing chamber and retained therein until properly cured or vulcanized and then removed from the chamber by the insertion of another set of charged formers or molds into the chamber.

We claim as our invention—

1. In an apparatus for curing or setting flexible material or articles made therefrom, in combination, a curing or setting chamber having an opening at each of its ends; and chambers at each end inclosing the said openings for the collection of fumes or gases that may escape from said openings.

2. In an apparatus for curing or setting flexible material or articles made therefrom, in combination, a curing or setting chamber having an opening at each of its ends; chambers at each end inclosing the said openings for the collection of fumes or gases that may escape from said openings; and means for discharging the gases and air from the end chambers.

3. In an apparatus for curing or setting flexible material or articles made therefrom, in combination, a curing or setting chamber having an opening at each of its ends; chambers at each end inclosing the said openings for the collection of fumes or gases that may escape from said openings; and guideways extending through the chambers for holding molds or formers containing the material or articles to be treated during their passage into and through the chambers.

4. In an apparatus for curing or setting flexible material or articles made therefrom, in combination, a curing or setting chamber having an opening at each of its ends; chambers at each end inclosing the said openings for the collection of fumes or gases that may escape from said openings; and doors for closing the openings of the curing or setting chamber.

5. In an apparatus for curing or setting flexible material or articles made therefrom, in combination, a curing or setting chamber having an opening at each of its ends; chambers at each end inclosing the said openings for the collection of fumes or gases that may escape from said openings; guideways extending through the chambers for holding molds or formers containing the material or articles to be treated during their passage into and through the chambers; and doors adapted to close the openings of the chambers and to be held open by the molds or formers, said doors being provided with a pliable facing arranged to lie in depressions in or irregularities of the molds or formers.

6. In an apparatus for curing or setting flexible material or articles made therefrom, in combination, a curing or setting chamber having an opening at each of its ends; chambers at each end inclosing the said openings for the collection of fumes or gases that may escape from said openings; a receptacle for holding a volatile setting or curing fluid; and a fluid holder and feeding device for maintaining a constant supply of fluid in the receptacle.

7. In an apparatus for curing or setting flexible material or articles made therefrom, in combination, a curing or setting chamber having an opening at each of its ends; chambers at each end inclosing the said openings for the collection of fumes or gases that may escape from said openings; and heating-pipes arranged within the setting or curing chamber.

8. In an apparatus for curing or setting flexible material or articles made therefrom, in combination, a curing or setting chamber having an opening at each of its ends; chambers at each end inclosing the said openings for the collection of fumes or gases that may escape from said openings; a receptacle for holding a volatile setting or curing fluid; a fluid holder and feeding device for maintaining a constant supply of fluid in the receptacle; heating-pipes arranged within the setting or curing chamber; and a pipe extending from said chamber for the discharge of the waste fumes or gases therefrom.

9. In an apparatus for curing or setting flexible material or articles made therefrom, in combination, a curing or setting chamber having an opening at each of its ends; chambers at each end inclosing the said openings for the collection of fumes or gases that may escape from said openings; a receptacle for holding a volatile setting or curing fluid; a fluid holder and feeding device for maintaining a constant supply of fluid in the receptacle; means for discharging the gases and air from the end chambers; and guideways extending through the chambers for holding molds or formers containing the material or articles to be treated during their passage into and through the chambers.

10. In an apparatus for curing or setting flexible material or articles made therefrom, in combination, a curing or setting chamber having an opening at each of its ends; chambers at each end inclosing the said openings for the collection of fumes or gases that may escape from said openings; guideways extending through the chambers for holding molds or formers containing the material or articles to be treated during their passage into and through the chambers; doors adapted to close the openings of the chambers and to be held open by the molds or formers, said doors being provided with a pliable facing arranged to lie in depressions in or irregularities of the molds or formers; a receptacle for holding a volatile setting or curing fluid; a fluid holder and feeding device for maintaining a constant supply of fluid in the receptacle; heating-pipes arranged within the setting or curing chamber; and a pipe extending from said chamber for the discharge of the waste fumes or gases therefrom.

11. In an apparatus for setting or curing flexible material or articles made therefrom, in combination, a curing or setting chamber having an opening at each of its ends; chambers at each end inclosing the said openings for the collection of fumes or gases that may escape from said end openings; guideways extending through the chambers; a line of formers for holding the material to be treated and held in the guideways; and mechanism for placing the material into, shaping it in the formers, and feeding the formers into and through the chambers.

12. In an apparatus for curing or setting flexible material or articles made therefrom, in combination, a curing or setting chamber having an opening at each of its ends; chambers at each end inclosing the said openings for the collection of fumes or gases that may escape from said openings; a receptacle for holding a volatile setting or curing fluid; a fluid holder and feeding device for maintaining a constant supply of fluid in the receptacle; heating-pipes arranged within the setting or curing chamber; a pipe extending from said chamber for the discharge of the waste fumes or gases therefrom; guideways extending through the chambers; a line of formers for holding the material to be treated and held in the guideways; and mechanism for placing the material into, shaping it in the formers, and feeding the formers into and through the chambers.

Signed at New York, in the county of New York and State of New York, this 12th day of May, A. D. 1899.

ALFRED SHEDLOCK.
    JAMES A. HUDSON.

Witnesses:
 M. TURNER,
 ARTHUR C. BLATZ.